United States Patent
Lanoy et al.

(10) Patent No.: US 11,818,055 B1
(45) Date of Patent: Nov. 14, 2023

(54) SYSTEMS AND METHODS FOR AUTOMATING RESOURCE DEPLOYMENT

(71) Applicant: Walmart Apollo, LLC, Bentonville, AR (US)

(72) Inventors: Aaron Lanoy, Cave Springs, AR (US); Rahul Ratnagiri, Redmond, WA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/828,838

(22) Filed: May 31, 2022

(51) Int. Cl.
*G06F 15/16* (2006.01)
*H04L 47/80* (2022.01)
*H04L 47/78* (2022.01)
*H04L 47/762* (2022.01)
*H04L 47/70* (2022.01)

(52) U.S. Cl.
CPC .......... *H04L 47/803* (2013.01); *H04L 47/762* (2013.01); *H04L 47/781* (2013.01); *H04L 47/828* (2013.01)

(58) Field of Classification Search
CPC ... H04L 47/803; H04L 47/762; H04L 47/781; H04L 47/808
USPC ....................................................... 709/226
See application file for complete search history.

(56) References Cited

U.S. PATENT DOCUMENTS 10,459,757 B1 * 10/2019 Srinivasan .......... G06F 9/45558
11,086,685 B1 *  8/2021 Koppes ............... G06F 9/45558
2012/0096461 A1 *  4/2012 Goswami ............. G06F 9/5088
                                                              718/1
2013/0138812 A1 *  5/2013 Assuncao ................ G06F 9/50
                                                              709/226
2016/0098286 A1 *  4/2016 Araujo ....................... G06F 8/71
                                                              718/1
2018/0032372 A1 *  2/2018 Devendran ........... G06F 9/5077
2019/0294477 A1 *  9/2019 Koppes ................. G06F 9/5072
(Continued)

FOREIGN PATENT DOCUMENTS

CN          111880811 A        11/2020

OTHER PUBLICATIONS

Gary Flynn, "Create Your First vSphere Terraform Configuration", Jan. 2022, garyflynn.com, https://web.archive.org/web/20220124095754/https://garyflynn.com/post/create-your-first-vsphere-terraform-configuration/ (Year: 2022).*

(Continued)

*Primary Examiner* — Ruolei Zong
(74) *Attorney, Agent, or Firm* — Morgan, Lewis & Bockius LLP; Manita Rawat

(57) ABSTRACT

A template generation system includes a computing device configured to, in response to receiving a request for a resource from a user device, identify a set of network identifiers based on the request and select a subset of identifiers of the set of network identifiers based on filtering criteria and the request. The computing device is further configured to, for each identifier of the subset of identifiers, in response to a record being associated with the corresponding identifier, clean the record and generate a new record defining the resource by mapping the requested resource to the corresponding identifier. The computing device is also configured to populate a template based on a set of rules identifying the subset of identifiers and the new record and transmit the template to a deployment system.

20 Claims, 5 Drawing Sheets

(56) References Cited

U.S. PATENT DOCUMENTS

2021/0203549 A1    7/2021  Snehashis et al.

OTHER PUBLICATIONS

Infoblox Deployment Guide, Infoblox Terraform Provider V2, Infoblox, Aug. 2021, 24 pages.
Terraform Bluecat Provider, BlueCat Networks, pp. 1-4, retrieved Jan. 31, 2022 <https://bluecatnetworks.com/integrations/adaptive-plugin/terraform-bluecat-provider/>.
Bhattacharjee, et al., "CloudCAMP: A Model-driven Generative Approach for Automating Cloud Application Deployment and Management", Institute for Software Integrated Systems, Vanderbilt University, 2017, 40 pages.
Moreira, "Terraform Provider Infoblox Network Resource", Sky-UK Ltd., Jul. 2017, retrieved Jan. 31, 2022 <https://github.com/sky-uk/terraform-provider-infoblox/wiki/Network-Resource>.

* cited by examiner

SYSTEMS AND METHODS FOR AUTOMATING RESOURCE DEPLOYMENT

TECHNICAL FIELD

The disclosure relates generally to systems and methods for automating resource deployment and more particularly to generating template documents based on received user-resource requests.

BACKGROUND

Oftentimes systems require a level of knowledge on the part of the user to implement a deployment of particular resources, such as virtual machines. However, a typical user does not necessary know and should not need to know all the particular rules for deployment something like a set of virtual machines to perform their work. It is unrealistic to think all users can have a full understanding of cloud computing structure and all the components needed to make correct decisions for environmental details outside of their control, such as which network(s) in a platform like Microsoft Azure™ to use.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The embodiments described herein are directed to a template generation system and related methods. The template generation system can include a computing device that is configured to, in response to receiving a request for a resource from a user device, identify a set of network identifiers based on the request and select a subset of identifiers of the set of network identifiers based on filtering criteria and the request. The computing device is further configured to, for each identifier of the subset of identifiers, in response to a record being associated with the corresponding identifier, clean the record and generate a new record defining the resource by mapping the requested resource to the corresponding identifier. The computing device is also configured to populate a template based on a set of rules identifying the subset of identifiers and the new record and transmit the template to a deployment system.

In further aspects, generating the new record defining the resource by mapping the requested resource to the corresponding identifier includes generating the new record based on the corresponding identifier and a location of the resource.

In further aspects, the filtering criteria include filtering the set of network identifiers based on a naming scheme.

In further aspects, the computing device is configured to generate a name for the subset of network identifiers by determining a number of minutes since a threshold time, converting the number of minutes since the threshold time using a conversion scheme, pseudo-randomly selecting a character string, and setting the name of each identifier by appending the character string to the converted number of minutes.

In further aspects, the conversion scheme is Base36.

In further aspects, the computing device is configured to determine a zone based on information transmitted from the user device and generate the new record based on a system associated with the zone.

In further aspects, the subset of network identifiers are selected pseudo-randomly after application of the filtering criteria.

In various embodiments of the present disclosure, a method of template generation is provided. In some embodiments, the method can include, in response to receiving a request for a resource from a user device, identifying a set of network identifiers based on the request and selecting a subset of identifiers of the set of network identifiers based on filtering criteria and the request. The method can include, for each identifier of the subset of identifiers, in response to a record being associated with the corresponding identifier, cleaning the record and generating a new record defining the resource by mapping the requested resource to the corresponding identifier. The method can include populating a template based on a set of rules identifying the subset of identifiers and the new record and transmitting the template to a deployment system.

In various embodiments of the present disclosure, a non-transitory computer readable medium is provided. The non-transitory computer readable medium can have instructions stored thereon, wherein the instructions, when executed by at least one processor, cause a device to perform operations that include, in response to receiving a request for a resource from a user device, identifying a set of network identifiers based on the request and selecting a subset of identifiers of the set of network identifiers based on filtering criteria and the request. The operations can include, for each identifier of the subset of identifiers, in response to a record being associated with the corresponding identifier, cleaning the record and generating a new record defining the resource by mapping the requested resource to the corresponding identifier. The operations can include populating a template based on a set of rules identifying the subset of identifiers and the new record and transmitting the template to a deployment system.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

In the drawings, reference numbers may be reused to identify similar and/or identical elements.

DETAILED DESCRIPTION

Figure 1:
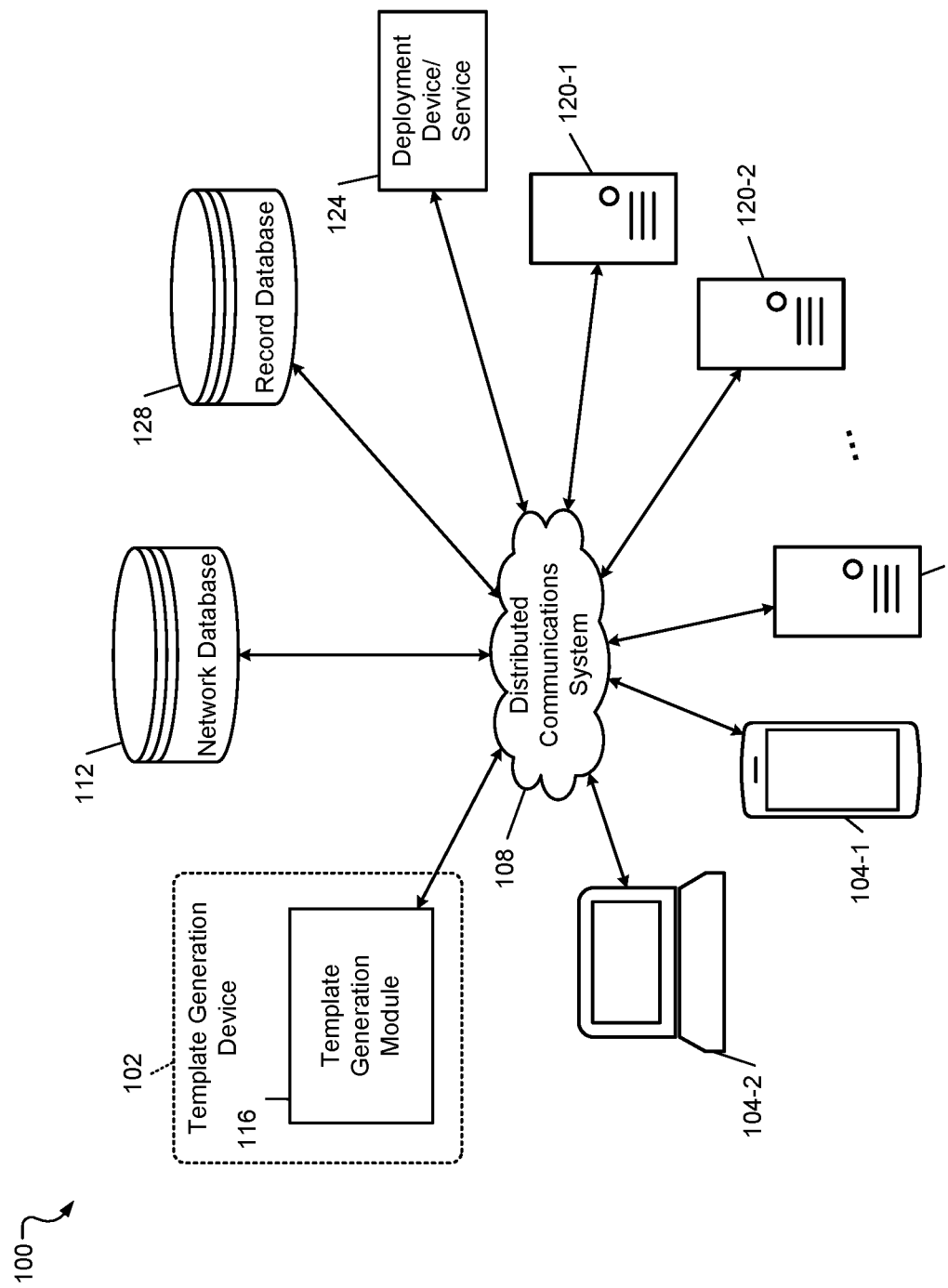
FIG. 1 is a block diagram of a template generation system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

A template generation system may be implemented to automatically format and create a template that can be digested by a deployment system for resource allocation. For example, when a user requests resources, such as use of a virtual machine, the user can simply request a virtual machine and the template generation system will receive and parse the request, creating an appropriate template to specifically request particular networks or subnets to be allocated to the user to implement the request, which here may be a virtual machine. For example, the template generation system may be used with a cloud services management system, such as Terraform™, to receive a direct request from a system user and generate a template to be submitted to the cloud services management system to identify and allocate the resources, such as particular servers/networks/subnets, to the request. The template generation system provides a solution to users to prevent the user from needing to know how to properly create a template for whichever system the resources are being collected from. That is, the template generation system will receive a user request, obtain necessary information from a deployment system (such as Terraform™), populate a template based on the available resources, and transmit the populated template to the deployment system to fulfill the user request, eliminating any need for the user to know the format, naming structures, etc., that the deployment system follows.

Referring to FIG. 1, a block diagram of a template generation system 100 is shown. The template generation system 100 may include a template generation device 102 and user devices 104-1 and 104-2, collectively user device 104, such as a phone, tablet, laptop, mobile computing device, desktop, etc., capable of communicating with a plurality of databases and modules via a distributed communications system 108. The user may submit a resource request, such as for a virtual machine, via the user devices 104. The template generation system 100 also includes a template generation module 116. The template generation device 116 receives the resource request and parses the information included in the request along with identifying information indicated by the user device 104 requesting the resource.

The template generation module 116 may obtain information regarding which networks are available from a network database 112. The network database 112 may be updated regarding which servers of a plurality of servers 120-1, 120-2, . . . , 120-N, collectively 120, are allocated to a particular user device or resource request. As shown, the plurality of servers 120 may be within multiple different networks and subnetworks. Along with allocation information, the network database 112 may store information regarding performance, names of the servers, which network the servers are on, etc. In various implementations, the plurality of servers 120 may be on a specific network associated with a deployment device or service 124, and the template generation module 116 may directly query the deployment device or service 124 to identify which of the plurality of servers 120 are available and the server characteristics.

Based on the availability of the plurality of servers 124, the template generation module 116 can populate a template to transmit to the deployment device or service 124 to instruct the allocation of identified servers 124 to the particular user request. As will be described in greater detail, the template generation module 116 can also identify a specific internet protocol (IP) address corresponding to available networks, servers, etc., if the specific resource request requires a name in order to fulfill the request. The template generation module 116 further may identify a zone or location of the user device requesting the resource and dynamically determine a particular endpoint, or which Domain Name System (DNS), to create, edit, or delete DNS records to associate particular networks with a request or delete stale DNS records. For example, services such as Infoblox™ can be used for this, however, in some systems, multiple endpoints exist based on location and zone. Therefore, the template generation module 116 can instead dynamically update the endpoint identifying the DNS associated with the user location and/or zone. Additionally, the template generation module 116 may check for stale DNS records associated with particular networks and delete the DNS record. For example, the DNS records may be stored in a record database 128 accessible via the distributed communications system 108. In various implementations, the DNS records may be stored at each of the servers 120.

Furthermore, the template generation module 116 may convert server, network, or subnet names to ensure that when the resource is being deployed by the deployment device or service 124, the names are unique. As is described in FIGS. 3 and 5, the template generation module 116 can determine a number of minutes that have occurred between a present time and a threshold period time, such as Jan. 1, 2000. This number may then be converted into a 3-5 character string, such as using Base36. To further ensure uniqueness in the naming, the template generation module 116 can then append an additional two characters to the converted string that are randomly generated to ensure the name of the server, network, or subnet is unique and linked to the particular resource request. While FIG. 1 shows the plurality of servers 120, the plurality of servers 120 may be networks or subnet used for requested resources.

The template generation device 102 and the user device 104 can be any suitable computing device that includes any hardware or hardware and software combination for processing and handling information. For example, the term "device" and/or "module" can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the distributed communications system 108. In various implementations, the devices, modules, and databases may communicate directly on an internal network.

As indicated above, the template generation device 102 and/or the user device 104 can be a computer, a workstation, a laptop, a server such as a cloud-based server, or any other suitable device. In some examples, template generation device 102 and/or the user device 104 can be a cellular phone, a smart phone, a tablet, a personal assistant device, a voice assistant device, a digital assistant, a laptop, a computer, or any other suitable device. In various implementations, the template generation device 102 is on a central computing system that is operated and/or controlled by a retailer. Additionally or alternatively, the modules and databases of the template generation device 102 are distributed among one or more workstations or servers that are coupled together over the distributed communications system 108.

The databases described can be remote storage devices, such as a cloud-based server, a memory device on another application server, a networked computer, or any other suitable remote storage. Further, in some examples, the databases can be a local storage device, such as a hard drive, a non-volatile memory, or a USB stick.

The distributed communications system 108 can be a WiFix network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The distributed communications system 108 can provide access to, for example, the Internet.

Figure 2:
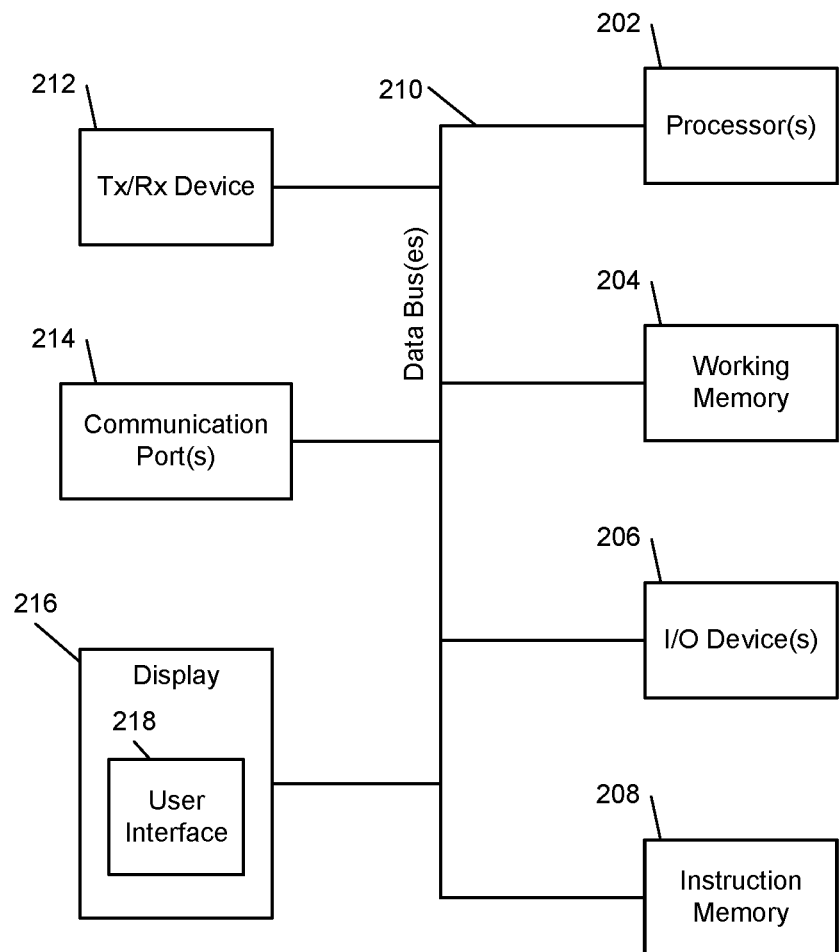
FIG. 2 is a block diagram of a computing device implementing the template generation device of FIG. 1 in accordance with some embodiments.

FIG. 2 illustrates an example computing device 200. The template generation device 102 and/or the user device 104 may include the features shown in FIG. 2. For the sake of brevity, FIG. 2 is described relative to the template generation device 102.

As shown, the template generation device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the template generation device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as data items including feedback information.

Display 216 can display a user interface 218. User interfaces 218 can enable user interaction with the template generation device 102. For example, user interface 218 can be a user interface that allows an operator to select and browse items via the ecommerce website or marketplace. The user interface 218 can, for example, display a request form and the user can submit or select a resource to request. In some examples, display 216 can be a touchscreen, where user interface 218 is displayed on the touchscreen.

Transceiver 212 allows for communication with a network, such as the distributed communications system 108 of FIG. 1. For example, if the distributed communications system 108 of FIG. 1 is a cellular network, transceiver 212 is configured to allow communications with the cellular network. In some examples, transceiver 212 is selected based on the type of distributed communications system 108 in which the template generation device 102 will be operating. Processor(s) 202 is operable to receive data from, or send data to, a network, such as the distributed communications system 108 of FIG. 1, via transceiver 212.

Figure 3:
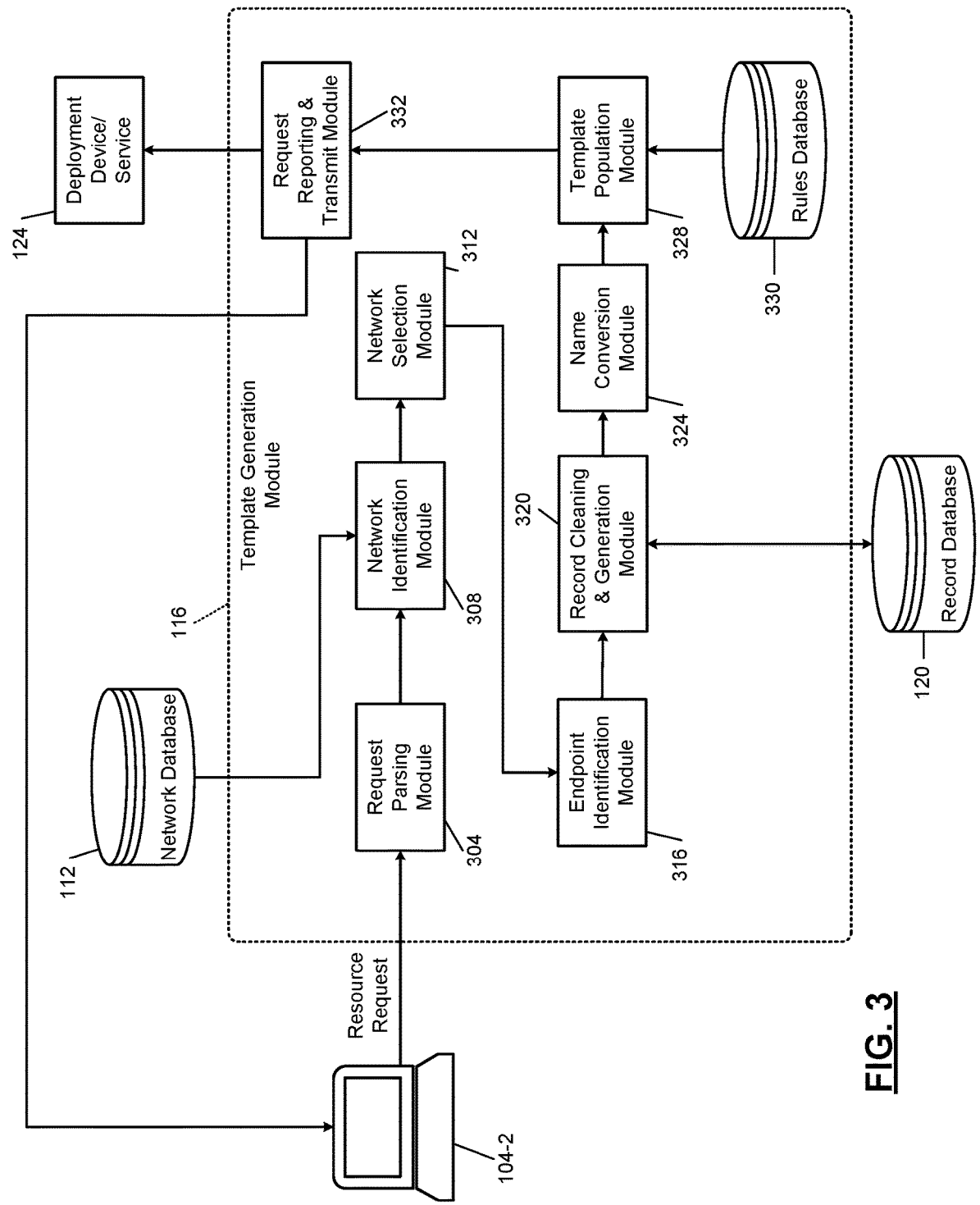
FIG. 3 is a block diagram illustrating an example template generation module of the template generation system of FIG. 1 in accordance with some embodiments.

Referring to FIG. 3, a block diagram illustrating an example template generation module 116 of the template generation system 100 of FIG. 1 is shown. The template generation module 116 includes a request parsing module 304 that receives a resource request from user device 104-2. The request parsing module 304 identifies the resource requested along with a location and a zone of the user device 104-2. For example, the zone may correspond to a particular DNS for which particular servers, networks, or subnets are accessible for use in deploying the requested resource. The resource request may also automatically indicate how many resources are requested, such as ten virtual machines. The parsed information of the request is forwarded to a network identification module 308 that identifies servers, networks, and/or subnets available for the resource request.

The network identification module 308 may obtain a list of networks from the network database 112 that are available to fulfill the resource request. As noted previously, the servers, networks, and/or subnet may be directly queried by the network identification module 308 to determine a list of available networks. Then, the network identification module 308 may filter the identified list of available networks based on the specifics of the resource request. In various implements, the list of networks may be filtered based on a naming scheme to identify those networks that are within a particular cloud computing system, such as Microsoft Azure™ Further, based on the resource request, the network identification module 308 may filter again based on the naming scheme that indicates whether the network is public or private. For example, if the resource request is a virtual machine, the network identification module 308 may only identify private networks for a virtual machine request based on how the resource requests are configured.

Additionally, based on the number of resources requested, the network identification module 308 may determine a number of IPs that are needed to fulfill the request. Therefore, based on the number of IPs, the network identification module 308 may further filter based on how much free space the list of networks have available. Finally, the network identification module 308 also determines whether the type of resource request may be spread across multiple IPs or if the request needs to be on one IP, which may further impact the amount of free space needed. The list of filtered networks is forwarded to a network selection module 312. The network selection module 312 may randomly select, based on how many IPs are needed to fulfill the request and based on whether the resource requested may be spread across multiple IPs from the list of filtered networks. In various implementations, the network selection module may, based on the resource request, determine if a particular IP name is needed to fulfill the request. That is, within the particular filtered networks, the network selection module 312 may obtain a name of a particular IP or IPs to specifically use in the populated template when deploying the resource.

The selected networks, and potentially the specifically named IP(s), are forwarded to an endpoint identification module 316 to identify an appropriate DNS based on the location and zone of the user device determined by the request parsing module 304. The endpoint identification module 316 identifies the proper DNS and forwards the DNS along with the selected networks to a record cleaning and generation module 320. The endpoint identification module 316 can dynamically determine the correct endpoint to use and can handle dynamically talking to each of the endpoints, even if a deployment requires DNS records on multiple endpoints at the same time. The record cleaning and generation module 320 determines if a stale DNS record based on the identified DNS is associated with the selected networks/IPs. If yes, the record is cleaned. Then, a new DNS record is generated based on the resource request and is associated with the selected network/IPs and added to the record database 120. In various implementations, the DNS record may be stored on the selected networks.

The identified networks/IPs are forwarded to a name conversion module 324 to generate a truly unique name for deployment. As mentioned previously, to ensure that the resources or networks identified in a template are globally unique, the name conversion module determines a number of minutes between a threshold time and a present time. For example, the threshold time may be a specific time, such as Jan. 1, 2000. Once the number of minutes is determined, the number is converted to a 4-5 character string, such as using Base36. The character string is then unique to the number of minutes and the name conversion module 324 renames the resource/network accordingly. Then, as multiple resources may be deployed, a random additional two characters are appended to the character string to name each network/IP/subnet or resource. In various implementations, the name conversion module 324 may skew time forward or backward as needed for extremely large deployments to ensure uniqueness.

The converted name associated with the selected networks is forwarded to a template population module 328. The template population module 328 obtains rules from a rules database 330 to properly populate the template for resource deployment for the deployment device or service 124. The template is forwarded to a request reporting and transmit module 332 that forwarded the populated template to the deployment device and service 124. In various implementations, a report may be generated and forwarded to the user device 104-2 to display to the user.

Figure 4:
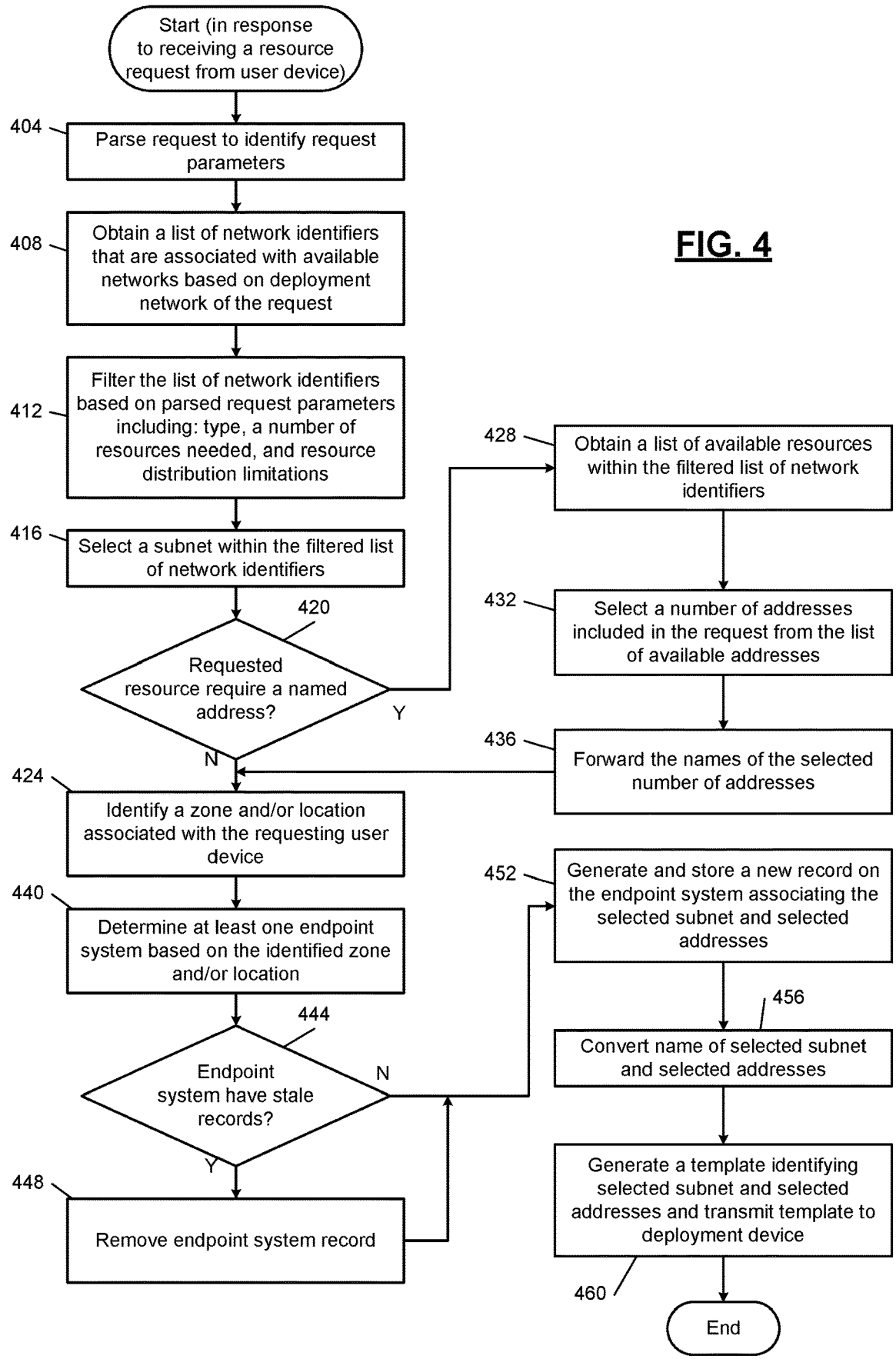
FIG. 4 is a flowchart of example methods of generating and transmitting a generated template to a deployment device in accordance with some embodiments.

Referring now to FIG. 4, a flowchart of example methods of generating and transmitting a generated template to a deployment device is shown. Control begins in response to receiving a resource request from a user device. Control continues to 404 to parse the request to identify the request parameters. Control proceeds to 408 to obtain a list of network identifiers that are associated with available networks based on deployment network of the request. Control continues to 412 to filter the list of network identifiers based on parsed request parameters, including type, a number of resources needed, and resource distribution limitations. As previously mentioned, control can also identify which networks can be used based on the naming scheme used.

Control proceeds to 416 to select a subnet/network/IP address within the filtered list of network identifiers. As noted, the selected subnet may correspond to a number of resources needed in the request and may be selected randomly or pseudo-randomly. Control continues to 420 to determine if the requested resource requires a named IP address. If no, control continues to 424 to identify a zone and/or a location associated with the requesting user device. If yes, control proceeds to 428 to obtain a list of available addresses within the filtered list of network identifiers. Control continues to 432 to select a number of addresses included in the request from the list of available addresses. Control may select the addresses randomly or pseudo-randomly. Control continues to 436 to forward the names of the selected number of addresses and continue to 424.

Control proceeds to 440 to determine at least one endpoint system based on the identified zone and/or location. Then, control continues to 444 to determine if the endpoint system has a stale record associated with any of the selected subnets of the filtered list of network identifiers. If yes, control removes the endpoint system record. If no, control proceeds to 452 to generate and store a new record on the endpoint system associating the selected subnet and selected addresses. Control continues to 456 to convert the name of the selected subnet and selected addresses, as detailed in FIG. 5. Control continues to 460 to generate a template identifying the selected subnet and the selected addresses and transmits the template to a deployment device. Then, control ends.

Figure 5:
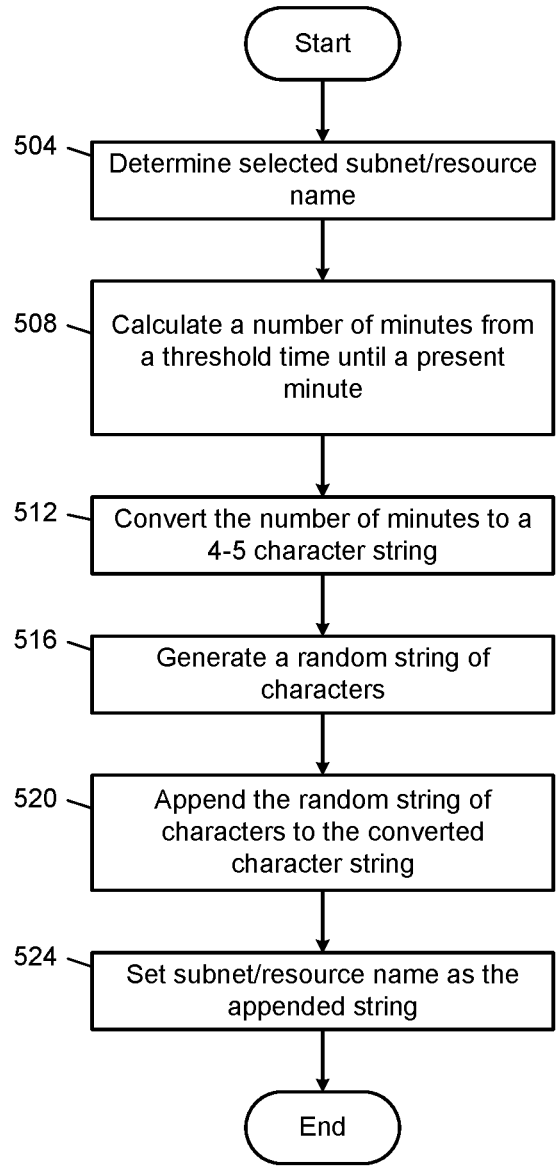
FIG. 5 is a flowchart of example methods of converting a name of a resource to a unique name in accordance with some embodiments.

Referring now to FIG. 5, a flowchart of example methods of converting a name of a resource to a unique name is shown. Control begins at 504 by determining a selected subnet or resource name (for example, an IP address).

Control continues to 508 to calculate a number of minutes from a threshold time until a present minute, indicating how many minutes have occurred from the threshold time to the present time. For example, the threshold time may be Jan. 1, 2000 at midnight or any other date. Control continues to 512 to convert the number of minutes to a 4-5 character string, for example, using Base36. Control continues to 516 to generate a random string of characters, for example, an additional two characters in length. Control continues to 520 to append the random string of characters to the converted character string. Then, control continues to 524 to set the subnet or resource name as the appended string and control ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
in response to receiving a request for a resource from a user device, identify a set of network identifiers based on the request;
select a subset of identifiers of the set of network identifiers based on filtering criteria and the request;
for each identifier of the subset of identifiers:
in response to a record being associated with the identifier, clean the record; and
generate a new record defining the resource by mapping the resource to the identifier;
generate a name for the subset of identifiers by:
determining a number of minutes since a threshold time;
converting the number of minutes since the threshold time using a conversion scheme;
pseudo-randomly selecting a character string; and
setting the name of each identifier by appending the character string to the converted number of minutes;
populate a template based on a set of rules identifying the subset of identifiers and the new record; and
transmit the template to a deployment system.

2. The system of claim 1, wherein generating the new record defining the resource by mapping the resource to the identifier includes generating the new record based on the identifier and a location of the resource.

3. The system of claim 1, wherein the filtering criteria include filtering the set of network identifiers based on a naming scheme.

4. The system of claim 1, wherein the conversion scheme is Base36.

5. The system of claim 1, wherein the computing device is configured to determine a zone based on information transmitted from the user device and generate the new record based on a system associated with the zone.

6. The system of claim 1, wherein the subset of identifiers are selected pseudo-randomly after application of the filtering criteria.

7. A method comprising:
in response to receiving a request for a resource from a user device, identifying a set of network identifiers based on the request;
selecting a subset of identifiers of the set of network identifiers based on filtering criteria and the request;
for each identifier of the sub set of identifiers:
in response to a record being associated with the identifier, cleaning the record; and
generating a new record defining the resource by mapping the resource to the identifier;
generating a name for the subset of identifiers by:
determining a number of minutes since a threshold time;
converting the number of minutes since the threshold time using a conversion scheme;
pseudo-randomly selecting a character string; and
setting the name of each identifier by appending the character string to the converted number of minutes;
populating a template based on a set of rules identifying the subset of identifiers and the new record; and
transmitting the template to a deployment system.

8. The method of claim 7, wherein generating the new record defining the resource by mapping the resource to the identifier includes generating the new record based on the identifier and a location of the resource.

9. The method of claim 7, wherein the filtering criteria include filtering the set of network identifiers based on a naming scheme.

10. The method of claim 7, wherein the conversion scheme is Base36.

11. The method of claim 7, further comprising determining a zone based on information transmitted from the user device and generating the new record based on a system associated with the zone.

12. The method of claim 7, wherein the subset of identifiers are selected pseudo-randomly after application of the filtering criteria.

13. A non-transitory computer-readable medium having instructions stored thereon, wherein the instructions, when executed by at least one processor, cause a device to perform operations comprising:
- in response to receiving a request for a resource from a user device, identifying a set of network identifiers based on the request;
- selecting a subset of identifiers of the set of network identifiers based on filtering criteria and the request;
- for each identifier of the subset of identifiers:
  - in response to a record being associated with the identifier, cleaning the record; and
  - generating a new record defining the resource by mapping the resource to the identifier;
- generating a name for the subset of identifiers by:
  - determining a number of minutes since a threshold time;
  - converting the number of minutes since the threshold time using a conversion scheme;
  - pseudo-randomly selecting a character string; and
  - setting the name of each identifier by appending the character string to the converted number of minutes;
- populating a template based on a set of rules identifying the subset of identifiers and the new record; and
- transmitting the template to a deployment system.

14. The non-transitory computer-readable medium of claim 13, wherein generating the new record defining the resource by mapping the resource to the identifier includes generating the new record based on the identifier and a location of the resource.

15. The non-transitory computer-readable medium of claim 13, wherein the filtering criteria include filtering the set of network identifiers based on a naming scheme.

16. The non-transitory computer-readable medium of claim 13, wherein the conversion scheme is Base36.

17. The non-transitory computer-readable medium of claim 13, wherein the operations further comprise determining a zone based on information transmitted from the user device and generating the new record based on a system associated with the zone.

18. The system of claim 1, wherein the filtering criteria comprises a number of networks needed to fulfill the request.

19. The method of claim 7, wherein the filtering criteria comprises a number of networks needed to fulfill the request.

20. The non-transitory computer-readable medium of claim 13, wherein the filtering criteria comprises a number of networks needed to fulfill the request.

* * * * *